(12) United States Patent
Michikawauchi et al.

(10) Patent No.: US 8,240,277 B1
(45) Date of Patent: Aug. 14, 2012

(54) INTERNAL COMBUSTION ENGINE

(75) Inventors: Ryo Michikawauchi, Susono (JP); Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 298 days.

(21) Appl. No.: 12/766,606

(22) Filed: Apr. 23, 2010

(51) Int. Cl.
*F02B 43/00* (2006.01)

(52) U.S. Cl. ........................................ 123/1 A

(58) Field of Classification Search ............ 123/1 A, 123/1 R, 2
See application file for complete search history.

(56) References Cited

U.S. PATENT DOCUMENTS

| | | | |
|---|---|---|---|
| 1,692,176 A * | 11/1928 | Kirschbraun | 44/301 |
| 3,930,988 A * | 1/1976 | Johnson | 208/182 |
| 4,393,817 A * | 7/1983 | Lindberg | 123/3 |
| 4,416,224 A * | 11/1983 | Hobby et al. | 123/3 |
| 4,478,177 A * | 10/1984 | Valdespino | 123/3 |
| 4,480,595 A * | 11/1984 | Hobby et al. | 123/1 A |
| 6,009,854 A * | 1/2000 | Rosgren et al. | 123/456 |
| 7,047,748 B2 * | 5/2006 | Zauderer | 60/775 |
| 2005/0130856 A1 * | 6/2005 | Svarcas et al. | 508/454 |

FOREIGN PATENT DOCUMENTS

| | | | |
|---|---|---|---|
| DE | 3135487 A | * 3/1983 | |
| JP | 5-332152 | 12/1993 | |

* cited by examiner

*Primary Examiner* — Noah Kamen
*Assistant Examiner* — Long T Tran
(74) *Attorney, Agent, or Firm* — Oliff & Berridge, PLC

(57) ABSTRACT

An internal combustion engine suppressing trouble in a fuel feed system or lubrication system even when using ammonia as fuel. The internal combustion engine is able to be fed ammonia as fuel and is provided with a fuel tank storing ammonia in a liquid state, a fuel injector injecting ammonia in a gaseous state into a combustion chamber or intake port, and a fuel passage connected to the fuel tank and fuel injector. Inside the fuel tank or fuel passage, there is arranged a substance that can absorb or adsorb water and cannot absorb and adsorb ammonia.

7 Claims, 7 Drawing Sheets

INTERNAL COMBUSTION ENGINE

BACKGROUND OF THE INVENTION

1. Field of the Invention

The present invention relates to an internal combustion engine.

2. Description of the Related Act

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see the following prior art).

As prior art, there is Japanese Patent Publication (A) No. 5-332152).

SUMMARY OF THE INVENTION

However, while ammonia can be used as fuel like the fossil fuel which has been used since the past, it in part also has properties different from fossil fuel. For example, ammonia is harder to burn compared with fossil fuels. Therefore, when using ammonia as fuel, some sort of measure is required for making the ammonia easier to burn. The internal combustion engine set forth in Japanese Patent Publication (A) No. 5-332152 is configured so as to use exhaust heat to reform ammonia so as to produce reformed gas comprised of hydrogen and nitrogen and so as to store the hydrogen in the produced reformed gas in a hydrogen storage alloy and feed the hydrogen stored in the hydrogen storage alloy to the combustion chamber in addition to ammonia to thereby enable easy burning even when using ammonia as fuel.

Further, ammonia does not differ from fossil fuel in only such a combustion property. For example, there are also differences pertaining to the fuel feed system or lubrication system. For example, in a case where fossil fuel is used as fuel, when moisture is contained in the fuel tank, alcohol is used to make the moisture contained in the fuel tank disperse into the fossil fuel and burn the moisture together with the fossil fuel. As opposed to this, in a case where gaseous ammonia is fed as fuel to the combustion chamber, when the liquid ammonia stored in the fuel tank is vaporized, the moisture contained in the ammonia is left without being vaporized and ends up remaining in the liquid ammonia. Therefore, the water concentration inside the liquid ammonia becomes high, leading to corrosion of the fuel tank inner surface, etc.

Further, in a fuel pump normally used in an internal combustion engine, the fuel itself is used for its lubrication, however, liquid ammonia has a comparatively low viscosity, therefore, when using liquid ammonia, the fuel pump cannot be sufficiently lubricated. Further, when using ammonia as fuel, ammonia becomes contained in the blow-by gas flowing out into the crankcase. Sometimes this ammonia is mixed into the lubricating oil, and sometimes, as a result, the lubricating oil becomes alkaline, causing lubricating oil deterioration, etc.

When using ammonia as a fuel in this way, there are unique problems occurring due to use of ammonia as fuel. In these cases, to enable good operation of the internal combustion engine, countermeasures addressing these problems are necessary.

SUMMARY OF THE INVENTION

Thus, in light of the above problems, an object of the present invention is to provide an internal combustion engine suppressing troubles in the fuel feed system or lubrication system even when ammonia is used as fuel.

To solve the above problem, a first aspect of the invention comprises an internal combustion engine able to use ammonia as fuel, provided with a fuel tank storing ammonia in a liquid state, a fuel injector injecting ammonia in a gaseous state into a combustion chamber or intake port, and a fuel passage connecting the fuel tank and fuel injector, wherein inside the fuel tank or fuel passage, there is arranged a substance that can absorb or adsorb water and cannot absorb and adsorb ammonia.

A second aspect of the invention comprises the first aspect of the invention, wherein the substance that can absorb or adsorb water and cannot absorb and adsorb ammonia is calcium oxide or strontium oxide.

A third aspect of the invention comprises the first aspect of the invention, wherein the substance that can absorb or adsorb water and cannot absorb and adsorb ammonia is arranged inside the fuel tank or fuel passage so as to be able to be replaced after absorbing or adsorbing water.

To solve the above problem, a fourth aspect of the invention comprises an internal combustion engine able to use as fuel a mixed fuel of liquid ammonia and a liquid with a viscosity higher than the liquid ammonia, provided with a fuel pump pressurizing and feeding the mixed fuel and a fuel injector injecting the mixed fuel fed from the fuel pump into a combustion chamber or intake port, wherein the fuel pump is driven so as to make the fuel pressure of mixed fuel fed to the fuel injector a target fuel pressure, and the maximum allowable fuel pressure for the target fuel pressure is made lower when the ratio of ammonia in the fuel is high in comparison to when the ratio is low.

To solve the above problem, a fifth aspect of the invention comprises an internal combustion engine able to use as fuel a mixed fuel of liquid ammonia and a liquid with a viscosity higher than the liquid ammonia, provided with a fuel pump pressurizing and feeding the mixed fuel, a fuel injector injecting the mixed fuel fed from the fuel pump into a combustion chamber or intake port, and an addition device adding into the mixed fuel fed to the fuel pump a viscosity improver with a viscosity higher than the liquid ammonia, wherein the amount of viscosity improver added to the mixed fuel is made to increase when the ratio of ammonia in the fuel is high in comparison to when the ratio is low.

To solve the above problem, a sixth aspect of the invention comprises an internal combustion engine able to use ammonia as fuel and able to make a lubricating oil lubricating each component of the internal combustion engine circulate, wherein an amphoteric compound reacting with both an acid and a base is added to the lubricating oil.

To solve the above problem, a seventh aspect of the invention comprises an internal combustion engine able to use ammonia as fuel and able to make a lubricating oil lubricating each component of the internal combustion engine circulate, provided with an oil pan storing the lubricating oil and having an amphoteric compound reacting with both an acid and a base arranged inside the oil pan.

Summarizing the advantageous effects of the invention, according to the present invention, even when ammonia is used as fuel, trouble occurring in the fuel feed system or lubrication system can be suppressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
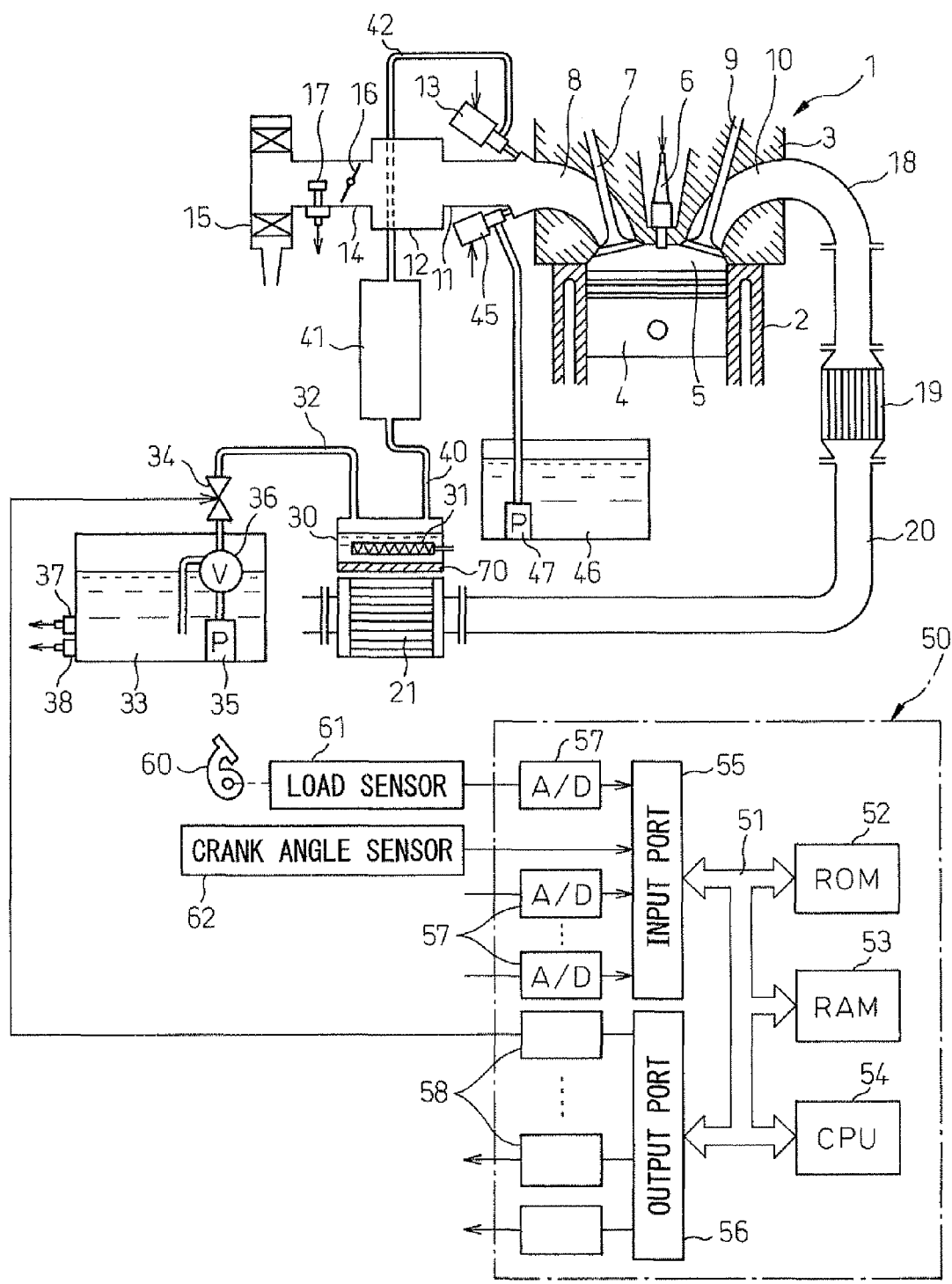
FIG. 1 is a view showing an internal combustion engine of a first embodiment of the present invention as a whole.

Below, referring to the drawings, embodiments of the present invention will be explained in detail. Note that, in the following explanation, similar component elements are assigned the same reference numerals.

First, referring to FIG. 1, an internal combustion engine of a first embodiment of the present invention will be explained. Referring to FIG. 1, 1 is an internal combustion engine body, 2 is a cylinder block, 3 is a cylinder head, 4 is a piston, 5 is a combustion chamber, 6 is an ignition device arranged at the center of the top surface of the combustion chamber 5, 7 is an intake valve, 8 is an intake port, 9 is an exhaust valve, and 10 is an exhaust port. In the embodiment shown in FIG. 1, the ignition device 6 is comprised of a plasma jet spark plug releasing a plasma jet. Further, in the internal combustion engine shown in FIG. 1, the fuel used is ammonia and a non-ammonia fuel easier to burn than ammonia. These two types of fuel are fed into the combustion chamber 5 where they are ignited by the ignition device 6.

In the present embodiment, the non-ammonia fuel may be fuel that is easier to burn than ammonia, for example, gasoline, diesel oil, liquefied natural gas, or hydrogen obtained by reforming ammonia. FIG. 1 show a case of using, as non-ammonia fuel, fuel ignited by a spark, for example, gasoline.

Now, referring back to FIG. 1, the intake port 8 is coupled through intake branch pipes 11 to a surge tank 12. In each intake branch pipe 11 is arranged an ammonia injector 13 for injecting gaseous ammonia toward the corresponding intake port 8. The surge tank 12 is coupled through an intake duct 14 to an air cleaner 15. Inside of the intake duct 15 is arranged a throttle valve 16 driven by an actuator and an intake air detector 17 using a hot wire for example.

On the other hand, the exhaust port 10 is coupled through an exhaust manifold 18 to an upstream exhaust gas purification system 19. In the embodiment shown in FIG. 1, the upstream exhaust gas purification system 19 is an ammonia adsorbent, etc., able to adsorb the ammonia in the exhaust gas or an $NO_x$ adsorbent, etc., able to adsorb the $NO_x$ in the exhaust gas. The upstream exhaust gas purification system 19 is coupled through an exhaust pipe 20 to a downstream exhaust gas purification system 21. In the embodiment shown in FIG. 1, this downstream exhaust gas purification system 21 is an oxidation catalyst, $NO_x$ storage reduction catalyst, $NO_x$ selective reduction catalyst able to purify the ammonia and $NO_x$ contained in the exhaust gas, etc.

Further, adjacent to the downstream exhaust gas purification system 21, there is arranged a vaporizer 30 for causing the liquid ammonia to vaporize. Inside this vaporizer 30, there is arranged a heater 31 so as to be able to vaporize the liquid ammonia even when the temperature of exhaust gas is low.

The vaporizer 30 is coupled through an ammonia inflow pipe 32 to an ammonia fuel tank 33. Inside this ammonia inflow pipe 32, there is arranged a shutoff valve 34 that opens when the engine is operating and is closed when the engine is stopped. The inside of the ammonia fuel tank 33 is filled with about 0.8 MPa to 1.0 MPa of high pressure liquid ammonia. Inside this ammonia storage tank 33, there is arranged an ammonia feed pump 35. A discharge port of the ammonia feed pump 35 is coupled to a relief valve 36 that returns the liquid ammonia to the ammonia fuel tank 33 when the discharge pressure is a certain value or more. The relief valve 36 is coupled to the ammonia inflow pipe 32.

When the pressure inside the ammonia fuel tank 33 is a high pressure of about 0.8 MPa to 1.0 MPa, the operation of the fuel feed pump 35 is made to stop. At that time, the liquid ammonia inside the ammonia fuel tank 33 is fed to the vaporizer 30 by the pressure inside the ammonia fuel tank 33. On the other hand, when for example the outside air temperature is low and the pressure inside the ammonia fuel tank 33 falls, liquid ammonia is fed by the fuel feed pump 35 to the vaporizer 30. Note that, the ammonia fuel tank 33 is mounted with a pressure sensor 37 for detecting the pressure inside the ammonia fuel tank 33 and a temperature sensor 38 for detecting the temperature of the liquid ammonia inside the ammonia fuel tank 33.

The gaseous ammonia made to vaporize inside the vaporizer 30 is fed through an ammonia outflow pipe 40 to an ammonia gas tank 41. The gaseous ammonia inside the ammonia gas tank 41 is fed through a gaseous ammonia feed pipe 42 to the ammonia injector 13. The gaseous ammonia is injected from the ammonia injector 13 toward the corresponding intake port 8.

Note that, in the present embodiment, the vaporizer 30 is used to heat liquid ammonia with the exhaust gas, however, use of only the heater or another method may be used to heat and vaporize the liquid ammonia. Further, in the present embodiment, there is provided a vaporizer 30 separate from the ammonia fuel tank 33, however, instead of using the vaporizer 30, the liquid ammonia inside the ammonia fuel tank may be heated by the exhaust gas or a heater, etc., to make the liquid ammonia vaporize inside the ammonia fuel tank.

On the other hand, as shown in FIG. 1, at each intake branch pipe 11, there is arranged a non-ammonia fuel injector 45 for injecting non-ammonia fuel toward the corresponding intake port 8. Each non-ammonia fuel injector 45 is fed with non-ammonia fuel inside the non-ammonia fuel tank 46 by a feed pump 47. As mentioned above, in the embodiment shown in FIG. 1, the non-ammonia fuel used is a fuel that is ignited by a spark. Note that, the non-ammonia fuel injector may be arranged at the top part of each combustion chamber 5 so as to directly inject non-ammonia fuel into the combustion chamber 5. In this case, the non-ammonia fuel used may be not only fuel that is ignited by a spark, but also fuel which self ignites.

As shown in FIG. 1, the electronic control unit 50 is comprised of a digital computer provided with a ROM (read only memory) 52, RAM (random access memory) 53, CPU (microprocessor) 54, input port 55, and output port 56 all connected to each other through a bi-directional bus 51. The output signals of the intake air detector 17 and the pressure sensor 37 are input through corresponding AD converters 57 to the input port 55. An accelerator pedal 60 is connected to a load sensor 61 generating an output voltage proportional to the amount of depression of the accelerator pedal 60. The output voltage of the load sensor 61 is input through a corresponding AD converter 57 to the input port 55. Further, the input port 55 is connected to a crank angle sensor 62 generating an output pulse each time the crankshaft rotates by for example 10°.

On the other hand, the output port 56 is connected through the corresponding drive circuits 58 to each ammonia injector 13, throttle valve 16 driving actuator, shutoff valve 34, fuel feed pump 35, non-ammonia fuel injector 45, and feed pump 47.

In this respect, when feeding ammonia into the ammonia fuel tank 33, besides the ammonia, air flows in. When the humidity of this air is high, a large amount of moisture is contained in the air. The moisture contained in the air flowing into the ammonia fuel tank 33 condenses when the outside air temperature falls, whereby water is produced. The water produced dissolves in the liquid ammonia inside the ammonia fuel tank 33.

If water dissolves in the liquid ammonia inside the ammonia fuel tank 33 in this way, the liquid ammonia inside the ammonia fuel tank 33 is fed by the fuel feed pump 35 in a state including water to the vaporizer 30. As explained, in the above vaporizer 30, the liquid ammonia is heated and can be made to vaporize. Here, the boiling point of ammonia is much lower than the boiling point of water, so normally, even if the ammonia vaporizes, the water does not vaporize and remains in the liquid ammonia inside the vaporizer 30.

If vaporization of only ammonia is repeated in this way, the water concentration in the liquid ammonia inside the vaporizer 30 gradually becomes higher. If the water concentration in the liquid ammonia becomes high, the moisture becomes apt to contact the inner surface of the vaporizer 30 and, as a result, may lead to a problem of rusting on the inner surface of the vaporizer 30.

On the other hand, when the liquid ammonia is heated at the vaporizer 30 to a comparatively high temperature, and water is also vaporized in addition to ammonia, the gaseous ammonia containing the moisture flows through the ammonia outflow pipe 40, ammonia gas tank 41, and ammonia feed pipe 42 (hereinafter these collectively referred to as the "gaseous ammonia passage"). When the gaseous ammonia is flowing through the gaseous ammonia passage, the gaseous ammonia becomes cooled by the outside air. If the gaseous ammonia contains moisture at this time, the moisture contained in the gaseous ammonia becomes the first to condense because the boiling point of water is higher than the boiling point of ammonia. Therefore, when vaporizing water in addition to ammonia at the vaporizer 30, sometimes the water condenses inside the gaseous ammonia passage and causes rusting of the inner surface of the piping forming the gaseous ammonia passage.

To suppress such rusting of the inner surface of the vaporizer 30 and gaseous ammonia passage, it is necessary to remove the moisture contained in the liquid ammonia. Thus, in a first embodiment of the present invention, inside the vaporizer 30 where the liquid ammonia is vaporized, there is arranged a substance 70 removing the moisture contained in the liquid ammonia (hereinafter referred to as a "moisture remover").

In the present embodiment, the moisture remover 70 used is a substance that absorbs or adsorbs water but does not absorb and adsorb ammonia. Further, the moisture remover 70 is preferably a substance that is hard to dissolve in ammonia. As such a substance, there are for example calcium oxide (CaO), strontium oxide (SrO), etc. As shown in FIG. 1, the moisture remover 70 is arranged on the bottom of the vaporizer 30.

By providing the moisture remover 70 inside the vaporizer 30 in this way, the moisture contained inside the liquid ammonia is removed. Due to this, the water concentration inside the liquid ammonia becomes low, so rusting of the inner surface of the vaporizer 30 is suppressed. Further, water vaporization is suppressed, and as a result, rusting of the inner surface of the piping forming the gaseous ammonia passage is suppressed.

Note that, in the above embodiment, there is arranged a moisture remover 70 inside the vaporizer 30. However, the moisture remover 70 may be arranged anywhere so long as it is a region where liquid ammonia exists, that is, so long as it is within the ammonia fuel tank 33 and the fuel passage through which the liquid ammonia flows (in the example shown in FIG. 1, the ammonia inflow pipe 32 and vaporizer 30).

However, taking as an example a case where the moisture remover 70 used is for example calcium oxide (CaO), if the calcium oxide absorbs water, it becomes calcium hydroxide (Ca(OH)$_2$) and becomes unable to absorb any more water. Therefore, if all of the calcium oxide (CaO) arranged inside the vaporizer 30 absorbs water, water cannot be absorbed anymore. In this case, in order to restore the water absorbing ability of the moisture remover 70, it is necessary to replace the moisture remover 70. Thus, the water remover 70 may be replaced by a new one when the water absorbing ability of the moisture remover 70 has fallen.

Figure 2:
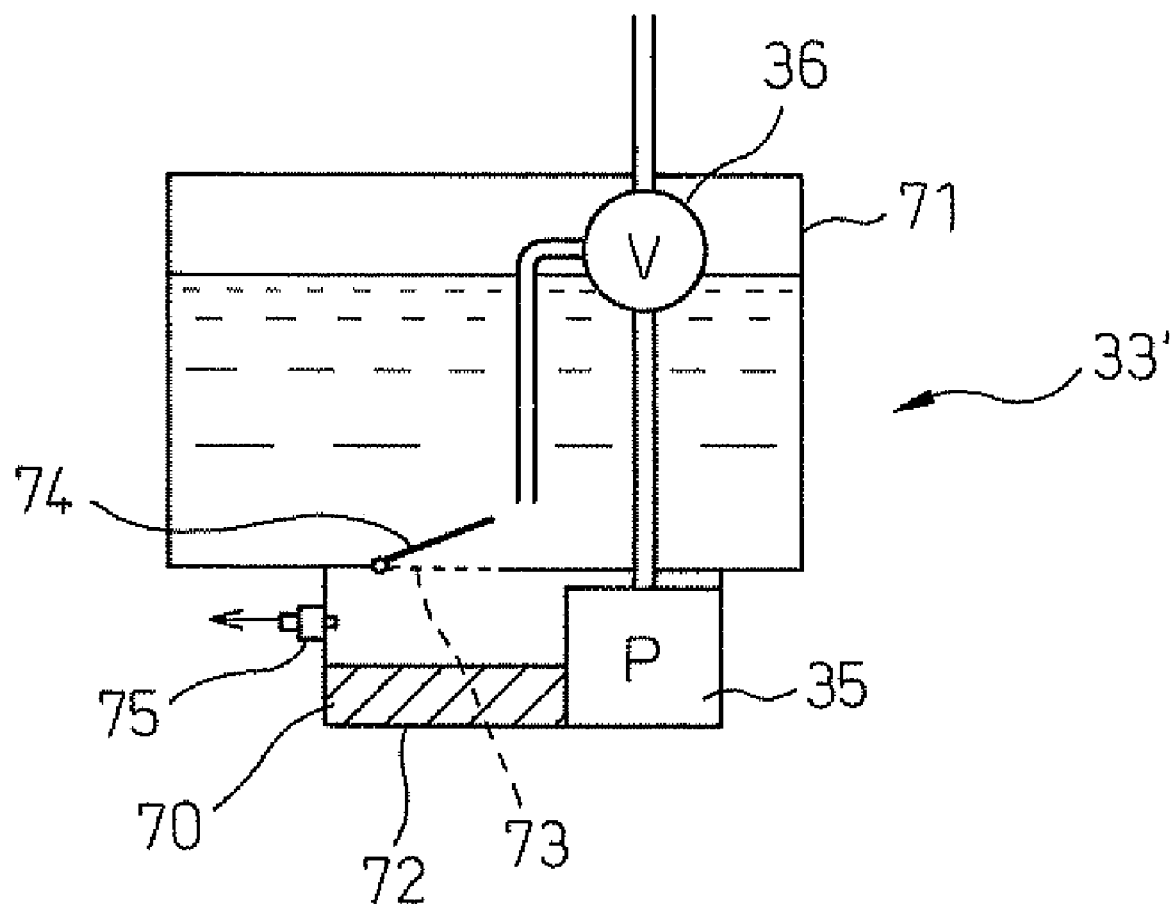
FIG. 2 is a view showing an ammonia fuel tank provided with a moisture remover replacing function.

FIG. 2 shows an ammonia fuel tank 33' provided with a replacing function for the moisture remover. In the example shown in FIG. 2, a case is shown where, in place of the vaporizer 30 or in addition to the vaporizer 30, there is also provided a moisture remover 70 inside the ammonia fuel tank 33'. In the example shown in FIG. 2, there is provided a moisture remover storage chamber 72 vertically below the fuel tank part 71 of the ammonia fuel tank 33'. Between the fuel tank part 71 of the ammonia fuel tank 33' and the moisture remover storage chamber 72, there is provided an opening 73 connecting the fuel tank part 71 and moisture remover storage chamber 72. This opening 73 is openable with an on-off valve 74. The moisture remover 70 is stored inside the moisture remover storage chamber 72, and the fuel feed pump 35 is arranged inside the moisture remover storage chamber 72, whereby liquid ammonia inside the moisture remover storage chamber 72 is fed to the vaporizer 30.

In such an ammonia fuel tank 33', normally, the on-off valve 74 is opened. Due to this, the liquid ammonia fed into the fuel tank part 71 of the ammonia fuel tank 33' flows through the opening 73 into the moisture remover storage chamber 72, then is fed by the fuel feed pump 35 to the vaporizer 30. Further, the moisture in the liquid ammonia is removed by the moisture remover 70 when the liquid ammonia passes through the moisture remover storage chamber 72.

On the other hand, when the moisture remover 70 absorbs a large amount of moisture in the liquid ammonia and becomes unable to absorb any more moisture in the liquid ammonia, the on-off valve 74 is closed, and the liquid ammonia inside the moisture remover storage chamber 72 of the ammonia fuel tank 33' is discharged by the liquid feed pump 35 from the moisture remover storage chamber 72. Almost all of the liquid ammonia discharged from the moisture remover chamber 72 is returned by the relief valve 36 into the fuel tank part 71 of the ammonia fuel tank 33'.

After the liquid ammonia is discharged from the moisture remover storage chamber 72, the moisture remover 70 inside the moisture remover storage chamber 72 is replaced from the outside. Due to this, the water absorbing ability of the moisture remover 70 recovers.

Note that, in the above embodiment, when the water absorbing ability of the moisture remover 70 has fallen, the moisture remover 70 is replaced. Specifically, when the time or running distance since replacement of a former moisture remover 70 has become a certain value or more, it is determined that the water absorbing ability of the moisture remover 70 has fallen to a certain level or less, and the moisture remover 70 is replaced. Further, there may be provided a sensor detecting the water concentration in the liquid ammonia so that when it is determined that the water concentration in the liquid ammonia detected by this sensor has become a certain concentration or more, it is determined that the water absorbing ability of the moisture remover 70 has fallen to a certain level or less.

Alternatively, when, for example, the moisture remover 70 used is calcium oxide, the water absorbing ability of the moisture remover 70 may be determined based on the sensor detecting the concentration of calcium hydroxide contained in the liquid ammonia. That is, calcium oxide changes to calcium hydroxide if moisture contained in the liquid ammonia is absorbed, and this calcium hydroxide dissolves slightly in the liquid ammonia. Therefore, if the moisture in the liquid ammonia is absorbed by the calcium oxide and the calcium hydroxide changed from calcium oxide is increased, the calcium hydroxide dissolved in the liquid ammonia increases. Therefore, when it is determined that the concentration of calcium hydroxide has become a certain concentration or more, it is determined that the water absorbing ability of the moisture remover 70 has fallen to a certain level or less.

Here, if the calcium hydroxide dissolves in the liquid ammonia, the permittivity of liquid ammonia changes. Thus, the concentration of the calcium hydroxide contained in the liquid ammonia is determined by detecting the permittivity of the liquid ammonia. Therefore, if the detected liquid ammonia permittivity becomes a certain value or more, it is determined that the concentration of calcium hydroxide in liquid ammonia has become a certain concentration or more, therefore, it is determined that the water absorbing ability of the moisture remover 70 has fallen to a certain level or less.

Further, in the above embodiment, as the system for replacing a moisture remover 70 with a new one, the ammonia fuel tank 33' provided with a moisture absorber storage chamber 72, on-off valve 74, etc., is used. However, any configuration of system may be used for replacing the moisture remover 70 with a new one so long as it can replace the moisture remover.

Figure 3:
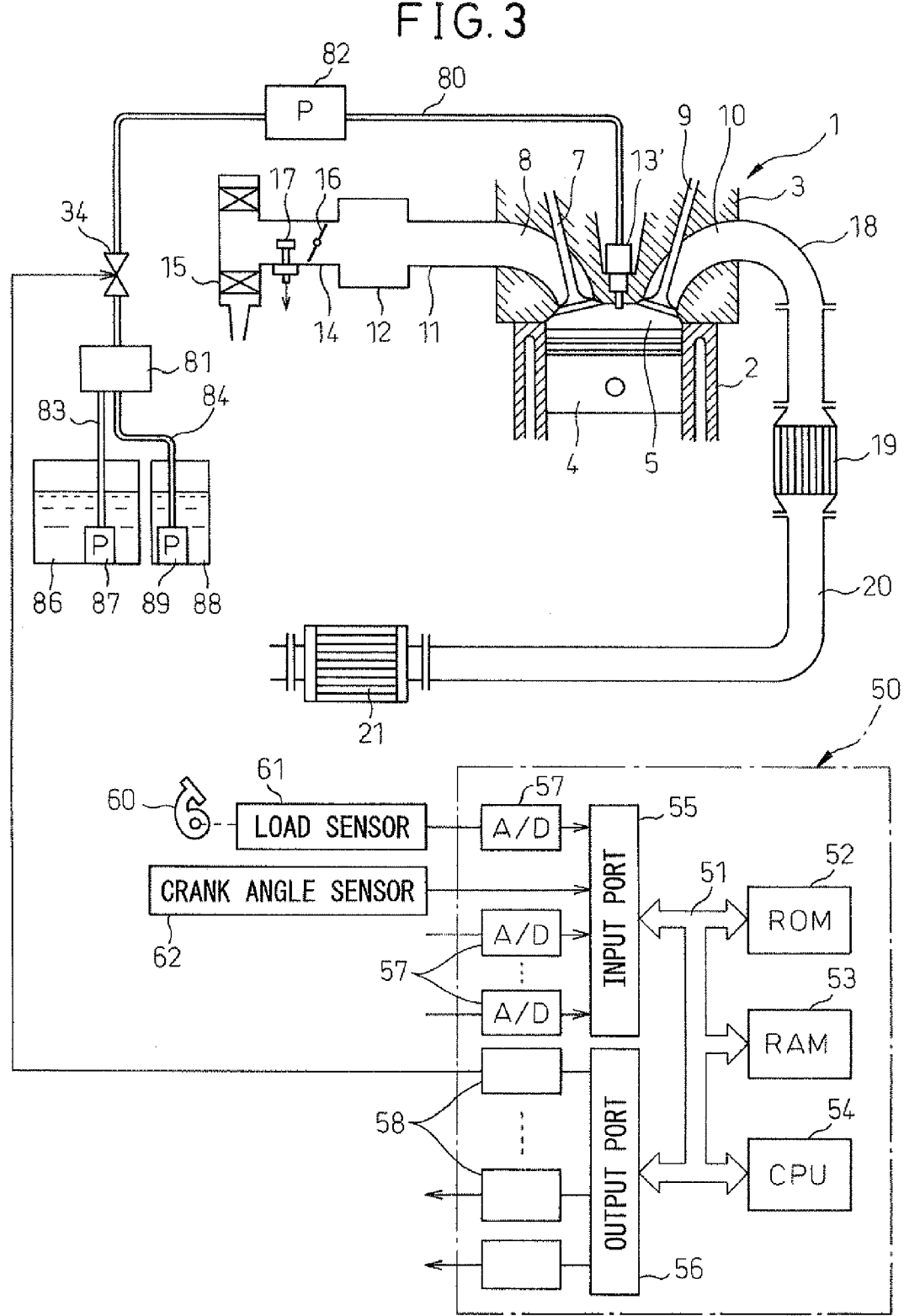
FIG. 3 is a view showing an internal combustion engine of a second embodiment of the present invention as a whole.

Next, referring to FIG. 3, a second embodiment of the present invention will be explained. Referring to FIG. 3, in the internal combustion engine of the present embodiment, a fuel injector 13' for injecting liquid fuel directly into the corresponding combustion chamber 5 is arranged at the top part of the combustion chamber 5. The fuel injector 13' is coupled through a fuel feed pipe 80 to a mixer 81. At the fuel feed pipe 80, there is provided a high pressure pump 82 for pressurizing the fuel flowing inside the fuel feed pipe 80 to a high pressure and feeding the fuel to the fuel injector 13'. Further, at the fuel feed pipe 80 upstream of the high pressure pump 82, there is arranged a shutoff valve 34 able to be made to close if the engine stops.

The mixer 81 is coupled to two feed pipes: an ammonia feed pipe 83 and a non-ammonia fuel feed pipe 84. The ammonia feed pipe 83 is coupled to an ammonia fuel tank 86, and the ammonia feed pipe 83 is provided with an ammonia feed pump 87 for feeding liquid ammonia inside the ammonia fuel tank 86 into the mixer 81. The non-ammonia fuel feed pipe 84 is coupled to a non-ammonia fuel tank 88, and the non-ammonia fuel feed pipe 84 is provided with a non-ammonia fuel feed pump 89 for feeding non-ammonia fuel inside the non-ammonia fuel tank 88 into the mixer 81.

In such an internal combustion engine, the ammonia feed pump 87 and non-ammonia fuel feed pump 89 are used to feed liquid ammonia and non-ammonia fuel to the mixer 81. The liquid ammonia and non-ammonia fuel are mixed inside the mixer 81. The fuel mixed inside the mixer 81 is fed through the fuel feed pipe 80 to the high pressure pump 82 and pressurized by the high pressure pump 82. The fuel given a high pressure at the high pressure pump 82 is fed to the fuel injector 13' and injected from the fuel injector 13' into a combustion chamber 5.

In the embodiment shown in FIG. 3, the non-ammonia fuel used is fuel which self ignites. However, when the non-ammonia fuel used is for example diesel oil, the liquid ammonia is hard to mix with the diesel oil. Therefore, alcohol, etc., may be mixed into the diesel oil in advance. Due to this, the liquid ammonia and diesel oil become easy to mix at the mixer 81.

Note that, the non-ammonia fuel used may be fuel that is ignited by a spark. In this case, an ignition device is provided at the top center part of the combustion chamber 5. This ignition device ignites the air-fuel mixture. In this case as well, if the non-ammonia fuel used is for example gasoline, the liquid ammonia and gasoline are difficult to mix. Therefore, alcohol, etc., may be mixed into the gasoline in advance. Due to this, the mixer 81 can easily mix the liquid ammonia and gasoline.

In this respect, in the embodiment shown in FIG. 3, the pressure of fuel fed to the fuel injector 13' (fuel pressure) is controlled by the high pressure pump 82 so as to become a target fuel pressure. The target fuel pressure is set according to the engine operation state. For example, the higher the engine load, or the higher the engine speed, the more the target fuel pressure is made to rise. Due to this, the fuel injector 13' can perform suitable fuel injection according to the engine operation state.

Further, in the embodiment shown in FIG. 3, the fuel injector 13' directly injects mixed fuel of ammonia and non-ammonia fuel into the corresponding combustion chamber 5. In this case, the fuel injector 13' sometimes injects fuel in a state where the air inside the combustion chamber 5 has become a comparatively high pressure, so the fuel must be injected from the fuel injector 13' at a high pressure. Therefore, in the embodiment shown in FIG. 3, a high pressure pump 82 is provided at the fuel feed pipe 80, and high pressure fuel is fed to the fuel injector 13'.

Here, in the high pressure pump 82, lubrication is normally performed by the fuel flowing through the inside the high pressure pump 82. Further, in the high pressure pump 82, the higher the pressure of the fuel (fuel pressure) made to rise by the high pressure pump 82, the higher the load on each component of the high pressure pump 82. As a result, the substance lubricating the high pressure pump 82 is required to have a high viscosity.

In this respect, the viscosity of ammonia is extremely low. Therefore, when the fuel used is only liquid ammonia, if trying to raise the output of the high pressure pump 82, that is, if trying to raise the fuel pressure of the fuel injector 13', the high pressure pump 82 is no longer suitably lubricated and, as a result, malfunctions and seizing of the high pressure pump 82 are invited due to poor lubrication.

On the other hand, the non-ammonia fuel contained in the fuel generally has a higher viscosity than liquid ammonia. Therefore, the higher the ratio of non-ammonia fuel contained in the fuel, the higher the lubrication performance of the high pressure pump 82 by the fuel. Therefore, the higher the ratio of non-ammonia fuel contained in the fuel, the higher the output the high pressure pump 82 can be raised without causing malfunctions, etc. In other words, the less the ratio of the liquid ammonia contained in the fuel, the higher the output the high pressure pump 82 can be raised without causing malfunctions, etc.

Thus, in the present embodiment, the maximum value allowable for the target fuel pressure (hereinafter, referred to as the "maximum allowable fuel pressure") is made to change according to the ratio of liquid ammonia contained in the fuel. More specifically, the maximum allowable fuel pressure is made lower when the ratio of liquid ammonia contained in the fuel is high in comparison to when the ratio is low. In particular, in the present embodiment, the higher the ratio of liquid ammonia contained in the fuel, the less the maximum allowable fuel pressure is made. Therefore, when the ratio of liquid ammonia contained in the fuel is low, the maximum allowable fuel pressure is made high, and as a result, the target fuel pressure can be raised to a comparatively high degree. In this case, the viscosity of the fuel is comparatively high, therefore even if the target fuel pressure is set high, the high pressure pump 82 can be lubricated. On the other hand, when the ratio of liquid ammonia contained in the fuel is high, the maximum allowable fuel pressure is made low, and as a result, the target fuel pressure cannot be raised very high. In this case, the viscosity of the fuel is comparatively low, however, the target fuel pressure cannot be set high, so malfunctions, etc., of the high pressure pump 82 can be suppressed.

That is, according to the present embodiment, by making the maximum allowable fuel pressure low when the ratio of liquid ammonia contained in the fuel is high, that is, by lowering the fuel pressure when the viscosity of fuel is low, a high fuel pressure can be maintained while suppressing malfunctions of the high pressure pump 82.

Note that, in the above embodiment, a case of mixing non-ammonia fuel with liquid ammonia was explained, however, what is mixed with the liquid ammonia may be any liquid so long as it is a liquid with a viscosity higher than the liquid ammonia. Therefore, the liquid mixed with the liquid ammonia may be, other than gasoline and diesel, GLT (Gas To Liquid) fuel, engine oil, etc.

Further, in the above embodiment, the ammonia and the liquid having a viscosity higher than the liquid ammonia are stored in separate tanks and are mixed together by the mixer 81. However, the liquid ammonia and the liquid having a viscosity higher than the liquid ammonia may be fed together into the ammonia fuel tank so as to mix the liquid ammonia and the liquid having a viscosity higher than the liquid ammonia inside the ammonia fuel tank. In this case, the tank 88 for storing a liquid having a viscosity higher than the liquid ammonia and the mixer 81 become unnecessary. Note that, in this case, if gasoline or diesel oil is used as the liquid having a viscosity higher than the liquid ammonia, the liquid ammonia and liquid having a viscosity higher than the liquid ammonia separate, so it is necessary to mix alcohol, etc., so as to mix these.

Figure 4:
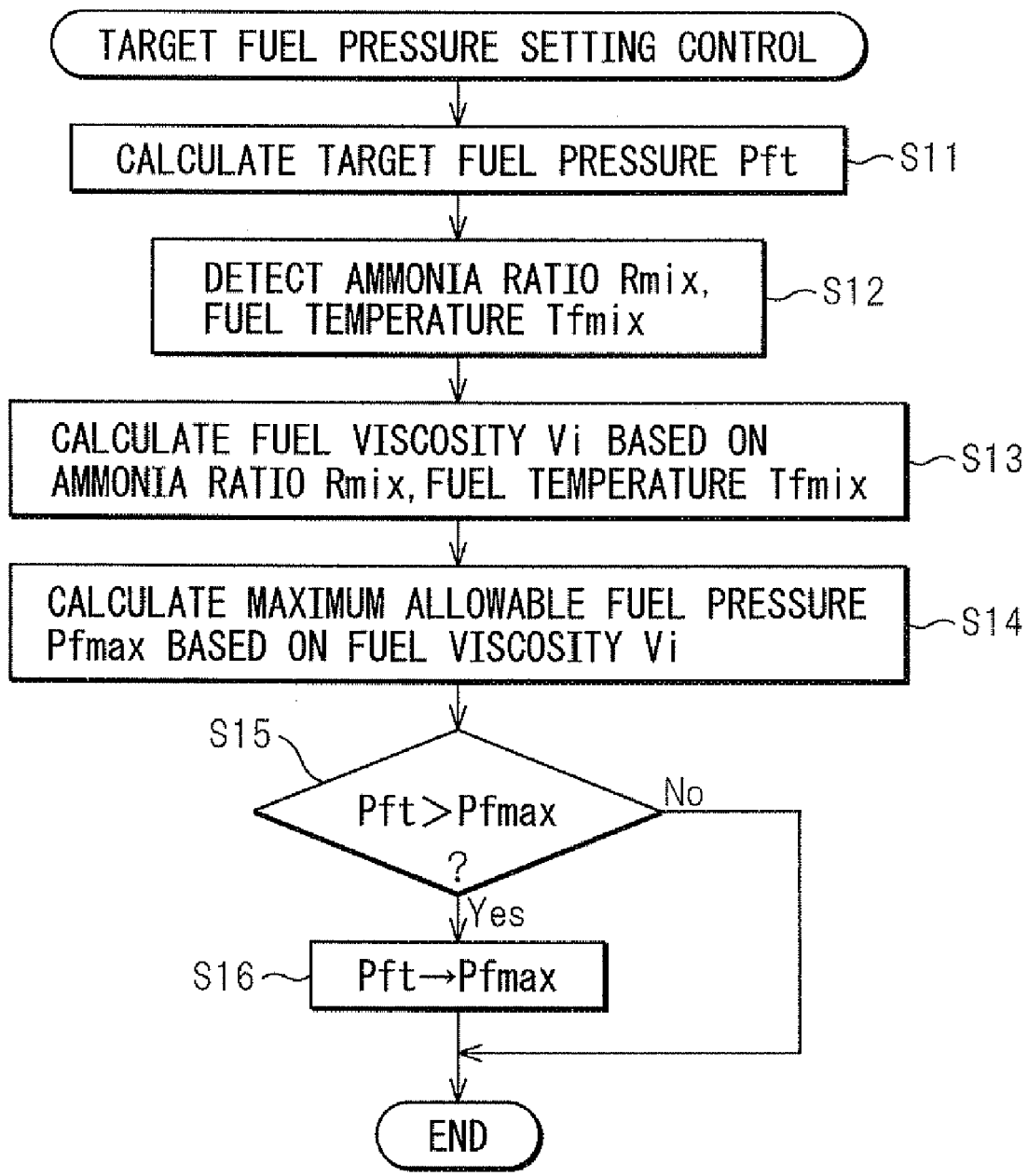
FIG. 4 is a flow chart showing a control routine of target fuel pressure setting control.

FIG. 4 is a flow chart showing a control routine of target fuel pressure setting control. The control routine shown in the drawing is executed by interruption every certain time interval. Referring to FIG. 4, first, at step S11, a target fuel pressure Pft is calculated based on the engine operating state. Here, as an engine operating state, for example the engine load may be mentioned. The higher the engine load, the higher the target fuel pressure Pft is made. Next, at step S12, a ratio Rmix of the ammonia in the mixed fuel produced by the mixer 81 is calculated based on the feed amount of ammonia by the ammonia feed pump 87 and the feed amount of non-ammonia fuel by the non-ammonia fuel feed pump 89. Further, the temperature Tfmix of fuel flowing inside the mixer 81, fuel feed pipe 80, or high pressure pump 82 is detected based on the output of a temperature sensor (not shown) provided inside the mixer 81, fuel feed pipe 80, or high pressure pump 82.

Next, at step S13, the viscosity Vi of the mixed fuel passing through the high pressure pump 82 is calculated based on the ratio Rmix of ammonia and temperature Tfmix of fuel calculated at step S12 using a map created in advance by calculation or experiments. More specifically, the higher the ratio Rmix of the ammonia, the lower the mixed fuel viscosity Vi calculated, and the higher the fuel temperature Tfmix, the lower the mixed fuel viscosity Vi calculated. Next, at step S14, the maximum allowable fuel pressure Pfmax allowable for the target fuel pressure is calculated based on the fuel viscosity Vi calculated at step S13 using a map created in advance by calculation or experiments. Next, at step S15, it is determined whether the target fuel pressure Pft calculated at step S11 is the maximum allowable fuel pressure Pfmax calculated at step S14 or more. When it is determined at step S15 that the target fuel pressure Pft is lower than the maximum allowable fuel pressure Pfmax, the target fuel pressure Pft is maintained as is, and the control routine can be made to end. On the other hand, if it is determined at step S15 that the target fuel pressure Pft is the maximum allowable fuel pressure Pfmax or more, the routine proceeds to step S16. At step S16, the target fuel pressure Pf is made the maximum allowable fuel pressure Pfmax and the control routine can be made to end. The high pressure pump 82 can be driven so as to give the target fuel pressure Pft calculated in this way.

Figure 5:
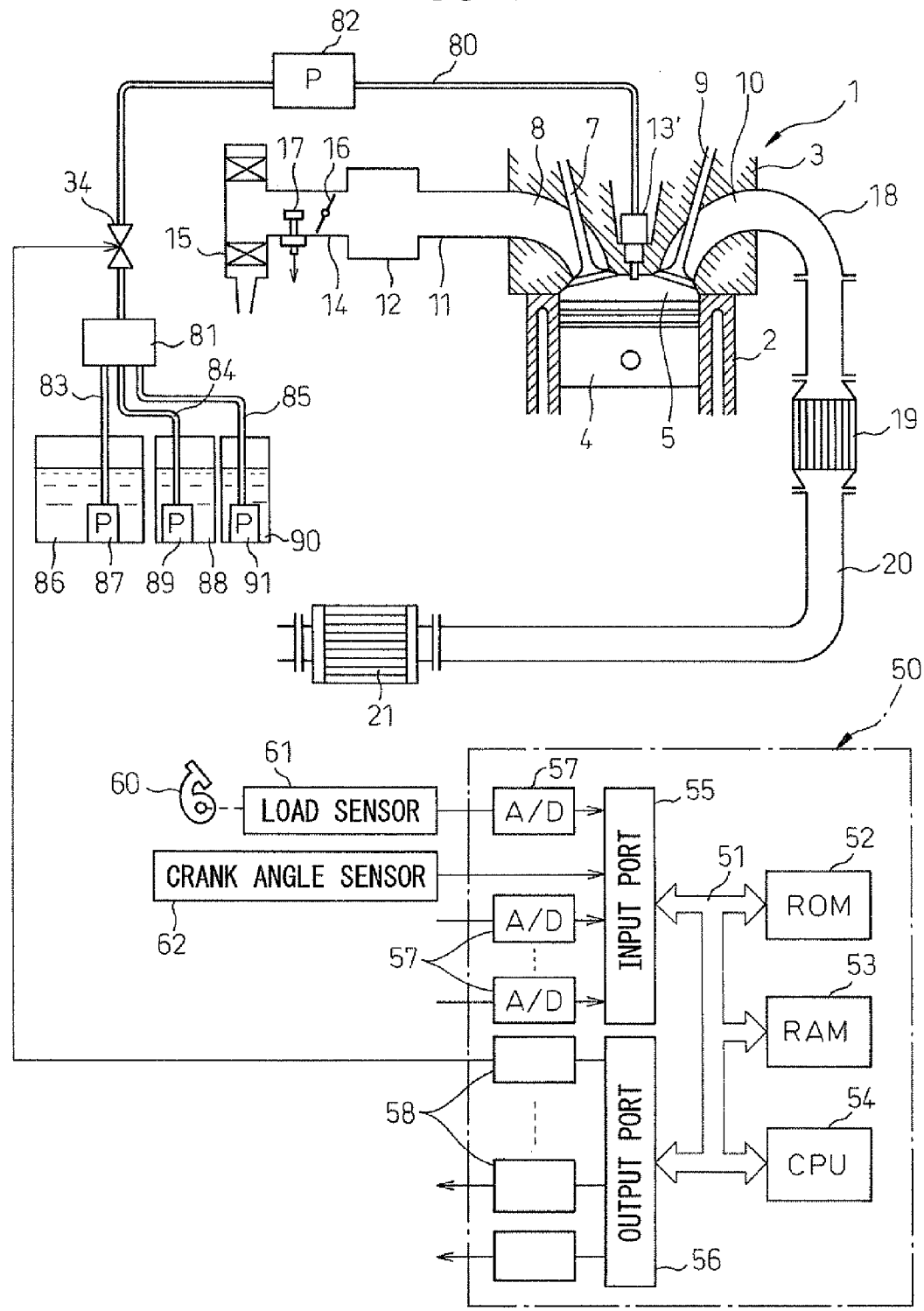
FIG. 5 is a view showing an internal combustion engine of a third embodiment of the present invention as a whole.

Next, referring to FIG. 5, a third embodiment of the present invention will be explained. FIG. 5 shows the configuration of the internal combustion engine of the third embodiment in the present invention. Referring to FIG. 5, the mixer 81 is coupled with the viscosity improver feed pipe 85 in addition to the ammonia feed pipe 83 and non-ammonia fuel feed pipe 84. The viscosity improver feed pipe 85 is coupled to the viscosity improver tank 90. At the viscosity improver feed pipe 85, there is provided a viscosity improver feed pump 91 for feeding the viscosity improver inside the viscosity improver tank 90 to the mixer 81.

The viscosity improver used is a liquid having a viscosity higher than the liquid ammonia, preferably a liquid having a viscosity higher than the non-ammonia fuel. Therefore, the viscosity improver used is gasoline, diesel oil, GLT (Gas To Liquid) fuel, engine oil, etc.

In this regard, the ratio of non-ammonia fuel in the fuel to be injected from the fuel injector 13' can be changed according to the engine operating state. Generally, the non-ammonia fuel used is a fuel that produces carbon dioxide when burned, so by making the ratio of non-ammonia fuel in the fuel low, the amount of carbon dioxide produced can be suppressed. Therefore, from the viewpoint of suppression of the amount of carbon dioxide produced, making the ratio of non-ammonia fuel in the fuel low is preferable. However, when, for example, the engine operating state is the engine startup time or another state where fuel is hard to burn inside the combustion chamber 5, the ammonia becomes hard to burn, so the ratio of non-ammonia fuel in the fuel is made high. On the other hand, when the engine operating state is engine high load operation or another state where fuel inside the combustion chamber 5 is easy to burn, the ammonia is also sufficiently burned, so the ratio of non-ammonia fuel in the fuel is made low.

However, as explained above, the viscosity of ammonia is extremely low, so if the ratio of ammonia contained in the fuel becomes high, that is, if the ratio of non-ammonia fuel contained in the fuel becomes low, the lubrication performance of the high pressure pump 82 by the fuel falls.

Thus, in the present embodiment, when the ratio of ammonia in the fuel is higher than a certain ratio, the viscosity improver is mixed into the fuel. That is, when the ratio of ammonia in the fuel is higher than a certain ratio, the viscosity improver feed pump 91 is operated to feed the viscosity improver inside the viscosity improver tank 90 to the mixer 81.

Further, in the present embodiment, when the ratio of ammonia in the fuel is high, the amount of viscosity improver added to the mixed fuel is increased in comparison to when the ratio is low. In particular, in the present embodiment, when the ratio of ammonia in the fuel is higher than a certain ratio, the higher the ratio of ammonia in the fuel, the more the viscosity improver added to the mixed fuel is increased.

That is, according to the present embodiment, by making the added amount of viscosity improver increase when the ratio of liquid ammonia contained in the fuel is high, that is, by raising the viscosity of mixed fuel by adding viscosity improver when the viscosity of the mixed fuel is low, a high fuel pressure is maintained while suppressing malfunctions of the high pressure pump 82.

Note that, in the above embodiment, the higher the ratio of liquid ammonia contained in the fuel, the more the added amount of viscosity improver is increased. However, instead of the viscosity improver, the non-ammonia fuel may be used, and the higher the ratio of liquid ammonia contained in the fuel, the more the added amount of non-ammonia fuel is increased. That is, the minimum required mixed fuel viscosity (limit fuel viscosity) at the high pressure pump 82 may be calculated based on the target fuel pressure determined according to the engine load, and the ratio of non-ammonia fuel in the mixed fuel may be set so that the viscosity of the mixed fuel becomes the limit fuel viscosity or more.

Figure 6:
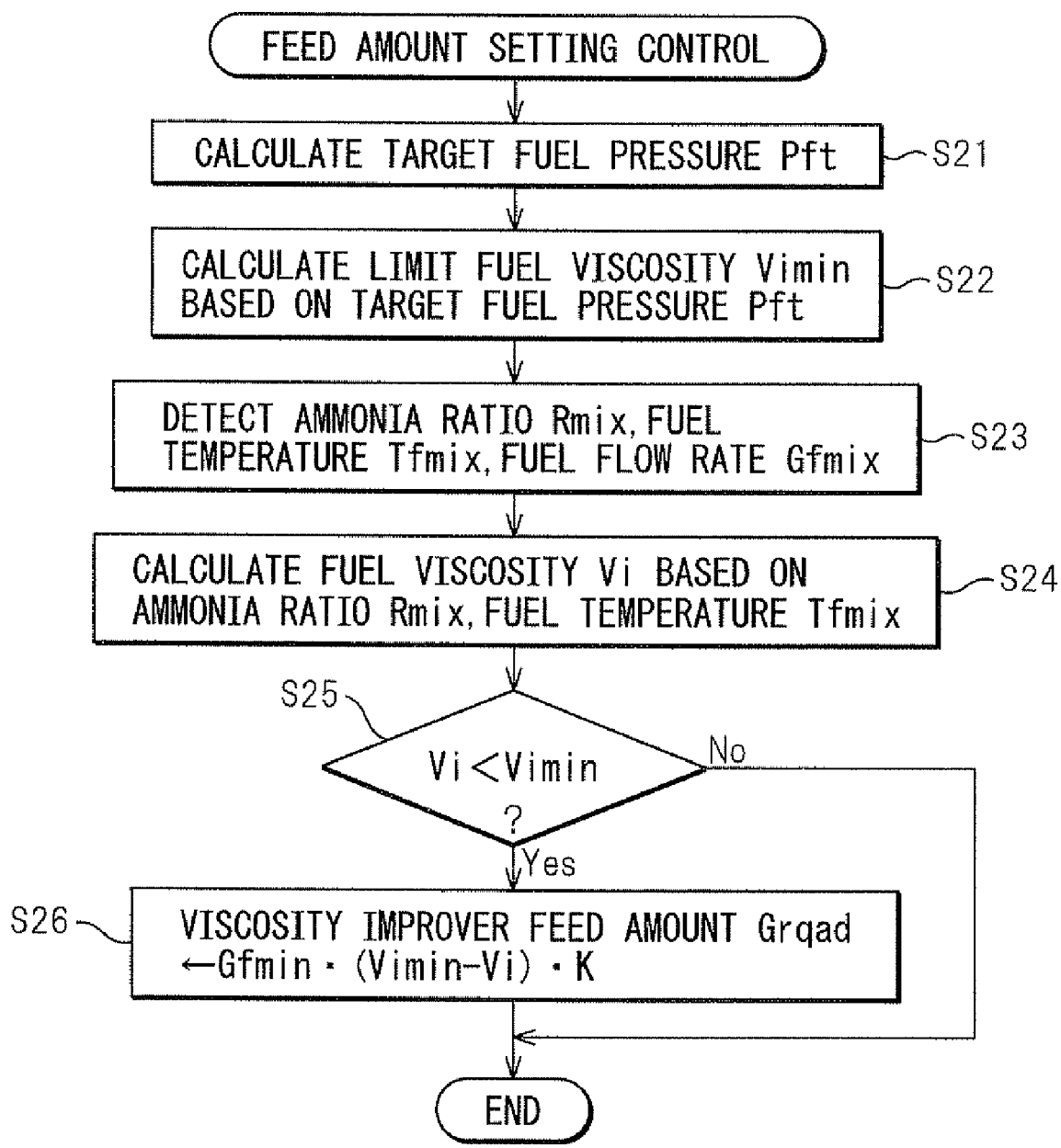
FIG. 6 is a flow chart showing a control routine of feed amount setting control of a viscosity improver.

FIG. 6 is a flow chart showing a control routine of feed amount setting control of the viscosity improver. The control routine shown in the drawing is executed by interruption every certain time interval. Referring to FIG. 6, first, at step S21, the target fuel pressure Pft is calculated based on the engine operation state. Here, as the engine operating state, the engine load may be mentioned. The higher the engine load, the higher the target fuel pressure Pft is made. Next, at step S22, the limit fuel viscosity Vimin is calculated based on the target fuel pressure Pft using a map determined in advance by calculation or experiments. Here, the limit fuel viscosity Vimin represents the minimum required fuel viscosity for preventing malfunctions, etc., in the high pressure pump 82 caused by falling of lubrication performance when the fuel pressure is made the target fuel pressure Pft.

Next, at step S23, the ratio Rmix of ammonia and the temperature Tfmix of the fuel are calculated in the same way as at step 12 of FIG. 4. Further, at step S23, the flow rate of fuel flowing in the high pressure pump 82 is calculated based on the engine speed detected by the crank angle sensor 62 and the fuel injection amount from the fuel injector 13'. Alternatively, a flow rate sensor (not shown) detecting the flow of the fuel may be provided at the fuel feed pipe 80 so as to detect the flow rate of fuel flowing in the high pressure pump 82 with the flow rate sensor.

At step S24, the viscosity Vi of mixed fuel passing through the high pressure pump 82 is calculated based on the ratio Rmix of ammonia and temperature Tfmix of fuel calculated at step S23 using a map created in advance by calculation or experiments. Next, at step S25, it is determined whether the fuel viscosity Vi calculated at step S24 is the limit fuel viscosity Vimin or more. When it is determined that the fuel viscosity Vi is higher than the limit fuel viscosity Vimin, the possibility of malfunctions, etc., occurring in the high pressure pump 82 is low even if the fuel viscosity is unchanged, so the control routine can be ended as is.

On the other hand, when it is determined at step S25 that the fuel viscosity Vi is lower than the limit fuel viscosity Vimin, the routine proceeds to step S26. At step S26, the following formula (I) is used to calculate the amount of viscosity improver fed per unit time from the viscosity improver tank 90 (viscosity improver feed amount) Grqad. Note that, in the following formula (I), K is a correction coefficient.

$$Grqad = Gfmix \cdot (Vimin - Vi) \cdot K \quad (1)$$

The viscosity improver is fed by the viscosity improver feed pump 91 from the viscosity improver tank 90 in exactly the viscosity improver feed amount calculated in this way.

Figure 7:
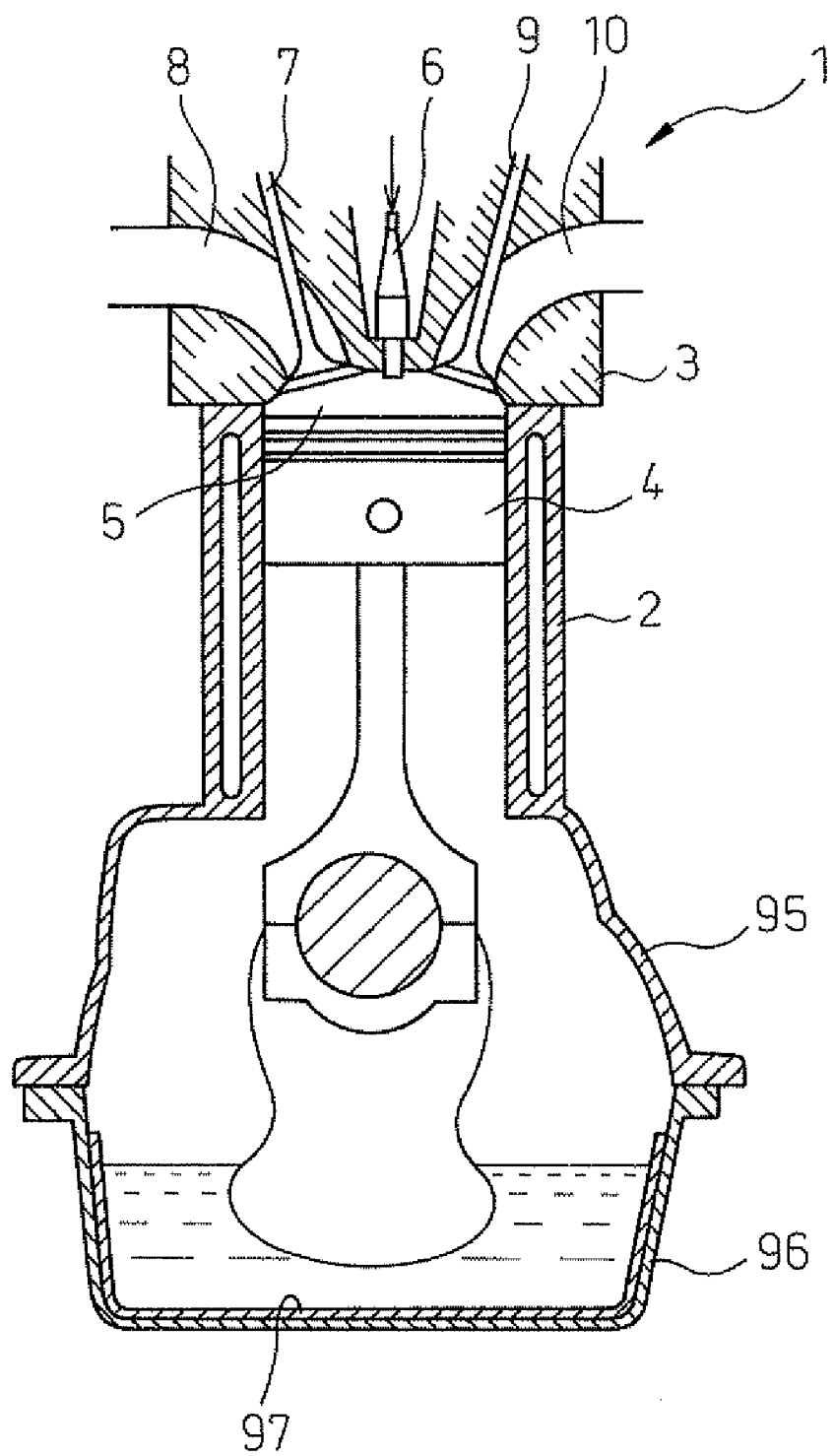
FIG. 7 is a view showing an engine body of the third embodiment of the present invention.

Next, referring to FIG. 7, a fourth embodiment of the present invention will be explained. Referring to FIG. 7, a crankcase 95 is provided below the cylinder block 2 of the engine body 1. Below this crankcase 95, there is provided an oil pan 96. Inside the oil pan 96 is stored lubricating oil for lubricating the moving parts of the internal combustion engine. The lubricating oil stored inside the oil pan 96 is made to circulate between the components of the internal combustion engine so as to lubricate these components.

Further, in the internal combustion engine of the present embodiment, the fuel used is ammonia and non-ammonia fuel similar to the above embodiments. The ammonia and non-ammonia fuel are injected by respective fuel injectors into the intake port 8 or the combustion chamber 5. Note that, in the present embodiment, the fuel used may be just ammonia as well.

However, generally, a portion of the air-fuel mixture fed into the combustion chamber 5 leaks out from the space between the cylinders of the cylinder block 2 and the pistons 4 and flows into the crankcase 95 as blow-by gas. In a case where ammonia is contained in the fuel, unburned ammonia fuel is contained in such blow-by gas. Therefore, a small amount of ammonia in the blow-by gas mixes into the lubricating oil, and as a result, the lubricating oil sometimes becomes alkaline, causing the lubricating oil to deteriorate.

Thus, in the internal combustion engine of the present embodiment, an ammonia buffer is added in the lubricating oil. Here, the "buffer" means a substance that acts so as to prevent the pH of a liquid from changing greatly even when adding a small amount of acid or base in a liquid contacting the buffer. As the buffer, there is mentioned an amphoteric compound reacting to both an acid and a base, for example, zinc hydroxide ($Zn(OH)_2$), aluminum hydroxide ($Al(OH)_3$), amino acid, alcohol, etc. By adding a buffer to the lubricating oil in this way, even if ammonia in blow-by gas mixes into the lubricating oil, the ammonia reacts to the buffer, and the lubricating oil can be kept from becoming alkaline.

Further, if an acidic compound is added to the lubricating oil to keep the lubricating oil from becoming alkaline, the lubricating oil becomes acidic, and the metal portions of the inside internal combustion engine become susceptible to corrosion. On the other hand, in the present embodiment, the buffer added is a neutral amphoteric compound, so the lubricating oil does not become acidic, therefore corrosion, etc., of the metal portions of the inside of the internal combustion engine can be suppressed.

On the other hand, sometimes $NO_x$ is produced when fuel containing ammonia is burned inside the combustion chamber 5. Sometimes a portion of the $NO_x$ produced inside the combustion chamber 5 leaks out from the space between the cylinders and pistons 4, therefore, sometimes $NO_x$ is contained in the blow-by gas. Further, when the non-ammonia fuel used is a hydrocarbon-based fuel, if the fuel is burned inside the combustion chamber 5, $SO_x$ is produced. Sometimes a portion of the $SO_x$ produced inside the combustion chamber 5 leaks out from the space between the cylinders and pistons 4, therefore, sometimes $SO_x$ is contained in the blow-by gas. If $NO_x$ and $SO_x$ are contained in the blow-by gas in this way, sometimes the $NO_x$ and $SO_x$ in the blow-by gas mix into the lubricating oil, and as a result, cause the lubricating oil to become acidic.

Here, in the present embodiment, the buffer is added to the lubricating oil, so even if $NO_x$ and $SO_x$ in the blow-by gas mix into the lubricating oil, the lubricating oil can be kept from becoming acidic.

Note that, in the above embodiment, a buffer is added to the lubricating oil, however, a solid buffer may be arranged inside the oil pan as well. In this case, for example, a plurality of pieces of buffer may be scattered inside the oil pan or, as shown in FIG. 7, the buffer 97 may be coated over entire inner surface or a portion of the inner surface of the oil pan 96. In the cases of arranging a solid buffer inside the oil pan in this way, the lubricating oil used can be a commercially available lubricating oil to which no buffer is added.

While the invention has been described with reference to specific embodiments chosen for purpose of illustration, it should be apparent that numerous modifications could be made thereto by those skilled in the art without departing from the basic concept and scope of the invention.

The invention claimed is:

1. An internal combustion engine able to use ammonia as fuel, comprising a fuel tank storing ammonia in a liquid state, a fuel injector injecting ammonia in a gaseous state into a combustion chamber or intake port, and a fuel passage connecting the fuel tank and fuel injector, wherein inside the fuel tank or fuel passage, there is arranged a substance that can absorb or adsorb water and cannot absorb and adsorb ammonia.

2. An internal combustion engine as set forth in claim 1, wherein the substance that can absorb or adsorb water and cannot absorb and adsorb ammonia is calcium oxide or strontium oxide.

3. An internal combustion engine as set forth in claim 1, wherein the substance that can absorb or adsorb water and cannot absorb and adsorb ammonia is arranged inside the fuel tank or fuel passage so as to be able to be replaced after absorbing or adsorbing water.

4. An internal combustion engine able to use as fuel a fuel that is a mixture of liquid ammonia and a liquid with a viscosity higher than the liquid ammonia, comprising a fuel pump pressurizing and feeding the mixed fuel, and a fuel injector injecting the mixed fuel fed from the fuel pump into a combustion chamber or intake port, wherein the fuel pump is driven so as to make the fuel pressure of mixed fuel fed to the fuel injector a target fuel pressure, and the maximum allowable fuel pressure for the target fuel pressure is made lower when the ratio of ammonia in the fuel is high in comparison to when the ratio is low.

5. An internal combustion engine able to use as fuel a fuel that is a mixture of liquid ammonia and a liquid with a viscosity higher than the liquid ammonia, comprising a fuel pump pressurizing and feeding the mixed fuel, a fuel injector injecting the mixed fuel fed from the fuel pump into a combustion chamber or intake port, and an addition device adding into the mixed fuel fed to the fuel pump a viscosity improver with a viscosity higher than the liquid ammonia, wherein the amount of viscosity improver added to the mixed fuel is made to increase when the ratio of ammonia in the fuel is high in comparison to when the ratio is low.

6. An internal combustion engine able to use ammonia as fuel and able to make a lubricating oil lubricating each component of the internal combustion engine circulate, wherein an amphoteric compound reacting with both an acid and a base is added to the lubricating oil.

7. An internal combustion engine able to use ammonia as fuel and able to make a lubricating oil lubricating each component of the internal combustion engine circulate, comprising an oil pan storing the lubricating oil and having an amphoteric compound reacting with both an acid and a base arranged inside the oil pan.

* * * * *